INVENTOR
Edward A. Stalker

April 4, 1950 E. A. STALKER 2,503,006
GAS TURBINE ENGINE WITH CONTROLLABLE AUXILIARY JET
Filed April 24, 1945 3 Sheets-Sheet 2

INVENTOR
Edward A. Stalker

INVENTOR
Edward A. Stalker

Patented Apr. 4, 1950

2,503,006

UNITED STATES PATENT OFFICE 2,503,006

GAS TURBINE ENGINE WITH CONTROLLABLE AUXILIARY JET

Edward A. Stalker, Bay City, Mich.

Application April 24, 1945, Serial No. 590,059

11 Claims. (Cl. 60—35.6)

My invention relates to prime movers particularly to those adapted to the propulsion of vehicles.

It is an object of the invention to provide an efficient and compact engine for aircraft in which the normal thermal propulsive jet is augmented by another propulsive jet.

Another object is to provide a prime mover particularly adapted for use with wings of high lifting capacity such as obtained with boundary layer control.

Another object is to provide an efficient means of increasing the effectiveness of any propulsive jet.

Still another object is to provide an effective means of governing the functions of the prime mover.

Other objects will appear from the specification, the drawings, and the claims.

The above objects are accomplished by the means illustrated in the accompanying drawings in which—

Figure 1:
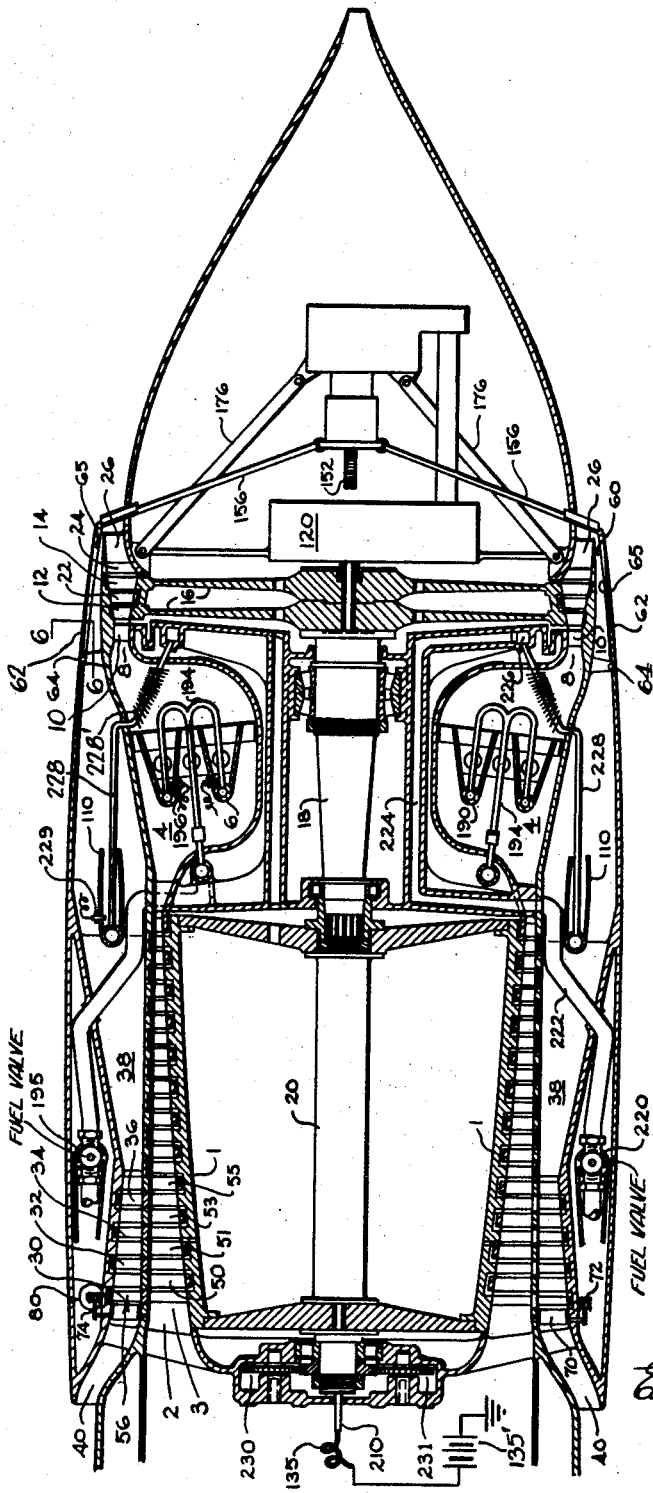
Figure 1 is a longitudinal fragmentary section of the prime mover.

This invention provides a prime mover which can produce a large thrust, as for instance, at take-off of an airplane, without the usual disadvantage of carrying a large extra weight of power plant when the airplane is in normal flight and has no immediate need for a large thrust.

For instance with wings equipped with boundary layer control means to augment the lift, the induced drag which always accompanies the lift ordinarily precludes the use of the full lift coefficient because the engines cannot produce sufficient thrust to overcome the drag and supply some excess for climbing.

The prime mover of one form of this invention comprises a main hot jet for continuous use as a propulsive means and an auxiliary cold jet for continuous use, to be converted to a hot jet for short periods of operation. Unique means are provided to make the jets cooperate and function efficiently.

In the figures the axial-flow compressor 1 has the annular inlet 2 of the annular passage 3 discharging compressed air into the combustion chamber 4 in which is located the burner 6 which burns fuel and heats the air leaving the chamber via the opening 8. Guide vanes 10 direct the hot gases in a proper direction onto the turbine blades 12 and 14 carried respectively on the turbine rotor hub 16 fixed to shaft 18, in turn attached to shaft 20 of the compressor 1.

Stator blades 22 and 24 also guide the flow of heated air of products of combustion (also called the gas) to the jet exit 26. This is the main propulsive jet.

Figure 3:
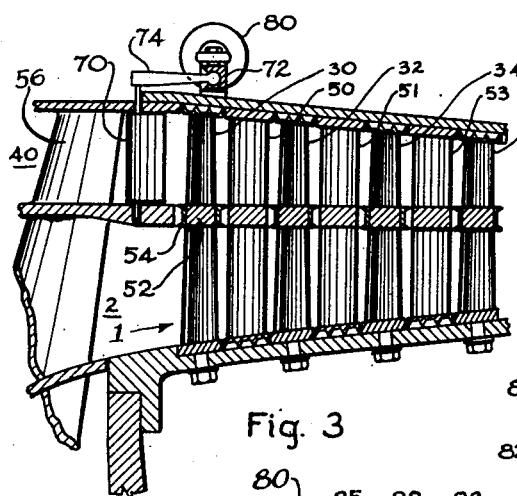
Figure 3 is an enlarged fragmentary section of the auxiliary blower blading.
Figure 4:
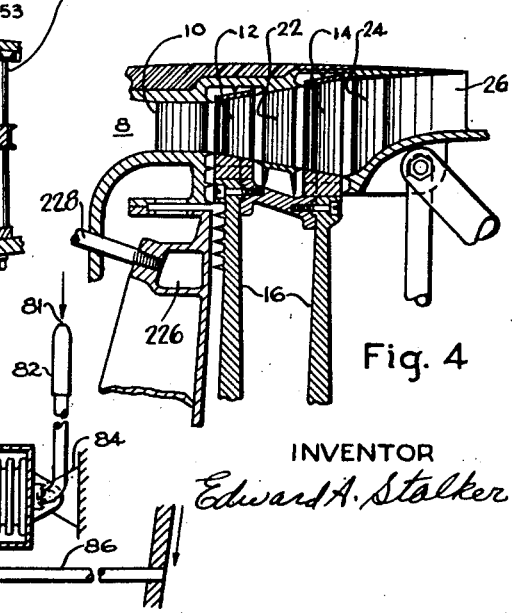
Figure 4 is an enlarged fragmentary section in the vicinity of the turbine blades.
Figure 7:
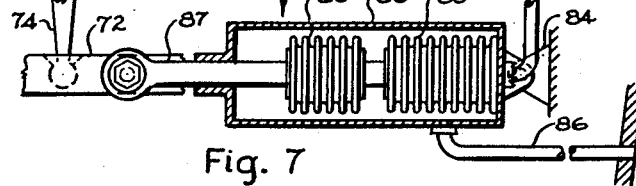
Figure 7 is a transverse section through the cylinder for controlling the stator blade setting in the auxiliary jet passage.

An auxiliary jet is generated by the rotor blades 30—32—34—36 in the annular duct 38 having the inlet 40. These blades are extensions of the blades operating in the annular passage having the inlet 2. The stator blades 50, 51, 53 and 55 direct the flow from the rotor blades. They are shown best in Figure 3. Where these blades occur the duct 38 is separated from the compressor passage 3 by suitable rings, some carried by the rotor blades and some by the stator blades.

The rotor rings are composite being formed of a light weight core 52 and metal side pieces 54. The core could be plastic or other light weight material.

Figure 6:
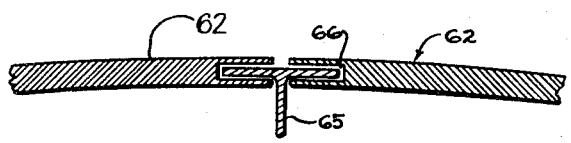
Figure 6 is a fragmentary section of the flaps along line 6—6 in Figures 1 and 2.
Figure 8:
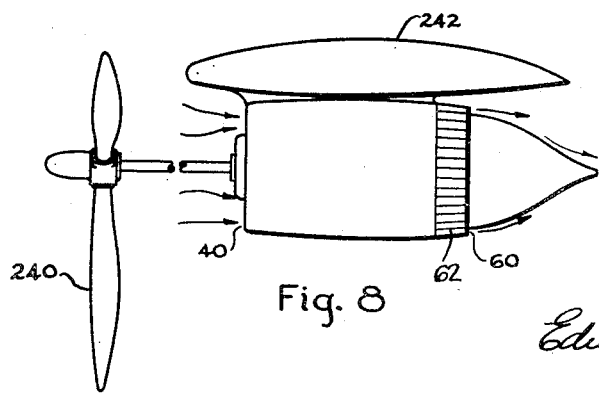
Figure 8 shows the prime mover installed in an airplane nacelle in combination with a propeller.

The duct 38 and the blades therein comprise the auxiliary blower 56. This blower forces a flow of air out the annular exit 60 whose cross section can be varied by means of the articulated flaps 62 hinged at 64. The flaps 62 are relatively short in the peripheral direction operably related by a T member 65 to form a substantially continuous circular hoop about the longitudinal axis of the machine. Fig. 8 shows the short width of the component 62. See Figure 6 particularly showing the components with the T member adjustably recessed in slots 66. The flaps are controlled by a governor whose action will be described subsequently.

The turbine rotors extract enough energy from the gas to drive the compressor 1 and the auxiliary blower 56.

When the airplane or vehicle in which the prime mover is mounted is stationary, there is no relative wind to provide a ram action at the inlet of the auxiliary blower. However as the vehicle attains a high forward speed there is a very significant inflow velocity to the auxiliary blower. An increased quantity flowing through the auxiliary blower will tend to consume an undue amount of power which has to be extracted from the turbine gas. This is undesirable since at high speed the jet from 26 is efficient. This unmounted condition is excluded by placing a plurality of adjustable vanes 70 distributed throughout the cross section of passage 38 just ahead of the first rotor blades 30.

The vanes 70 are of airfoil cross section, preferably symmetrical, and act to change the direction of the flow approaching the first rotor blades. These vanes are not a throttling device which would impair the efficiency of the blower by causing turbulence. Their purpose is rather to direct the air with respect to the first rotor blades so as to reduce the angle of attack of these blades whereby they exert less pumping action than when the vanes 70 permit an axial inflow.

The vanes 70 are pivotally mounted in suitable bearings and are controlled collectively by the ring 72 and arms 74. The ring 72 extends about the outside periphery of the auxiliary blower as shown in Figure 1.

The ring is rotated about its axis by means of the sylphon mechanism 80 in accordance with the dynamic pressure of the relative wind acting on the forward directed opening 81 of pitot tube 82 in communication with the interior of the sylphon 83 whose upper end is fixed to bracket 84. Another sylphon 85 is attached in series with the dynamic pressure sylphon 83. The second sylphon is a vacuum type and compensates for altitude or density changes without being affected by temperature. Both sylphons are housed within the pivoted chamber 88 which has access to the static pressure via the static tube 86, and are articulated to the ring 72. The net expansion or contraction of the sylphons changes the position of the rod 87 which in turn rotates the ring 72 adjusting the vanes 70.

At take-off of the airplane carrying the prime mover a large thrust is required. To achieve this fuel is burned in the passage 38 by means of the burner 110. This heats the air and reduces its density. It is necessary then that the exit 60 be expanded to pass the same mass of air. This is provided for automatically.

When fuel is first burned in duct 38 the heated air cannot pass quickly enough through the exit 60 because of its lower density. There is therefore less flow through the auxiliary blower and it consumes less power. As a consequence the turbine shaft 18 speeds up. The increased rate of rotation causes the governor mechanism 120 to open the exit 60 until the speed resumes the proper value. Thus it is clear that this sequence of actions is executed automatically in response to the ignition of the fuel in duct 38.

Figure 5:
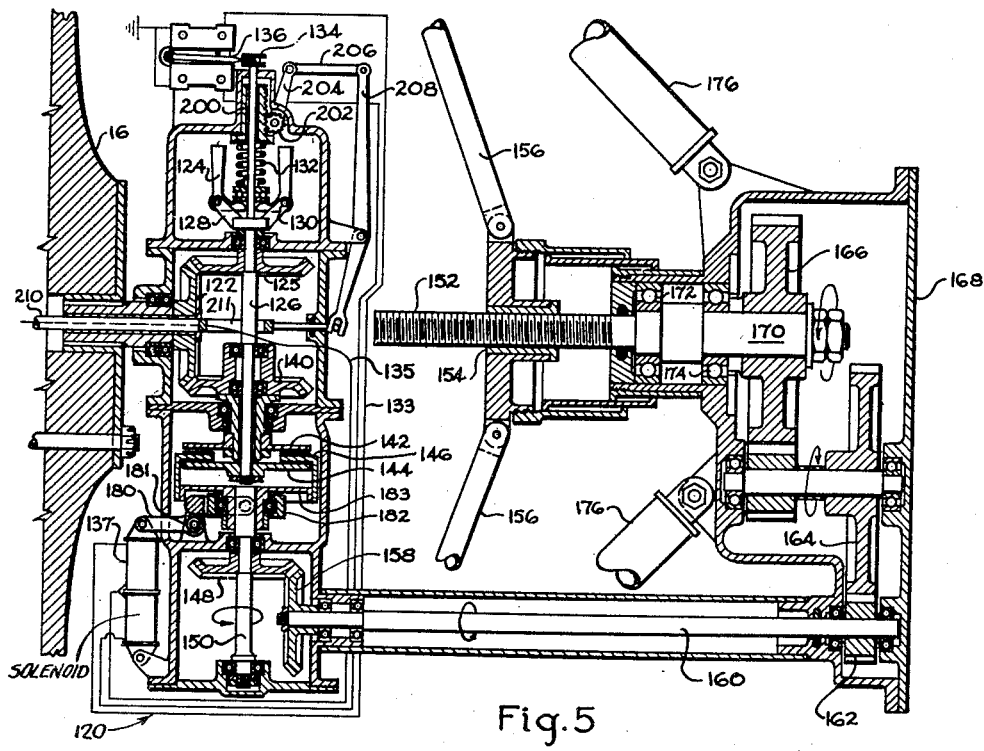
Figure 5 is an enlarged view in section of the turbine governor.

The governor is shown in detail in Figure 5. The gear 122 is fixed to the turbine rotor 16 and drives the governor weights 124 by means of gear 125, shaft 126 and brackets 128 to which the weights are hinged at 130. With an increase in rotor speed the weights tend to fly outward and compress the spring 132 while raising the spindle 134. This spindle actuates a spring leaf contactor 136 connected in a circuit 133 having an electric current source 135' Figure 1 connected to wire 135. The contactor serves to energize the solenoid 137 in a direction selected by the switch. The solenoid actuates a friction drive which moves the flaps.

The friction drive derives power from the rotor 16 via gear 140 rotatably borne on shaft 126 in opposition thereto. It carries fixed to itself the driver plate 142 while shaft 126 carries the plate 144. Since these plates rotate in opposite directions the driven element 146 will take up a direction of rotation dependent upon which driver plate it is pressed against. If the solenoid 137 presses the element against the lower plate the gear 148 will be rotated as shown by the arrow about its shaft 150. This rotation is transmitted to the screw 152 which moves the nut block 154 forward opening the exit 60 by means of the articulated links 156 and flaps 62.

The action is transmitted from gear 148 by means of gear 158, shaft 160, gears 162, 164, 166 and shafts suitably borne in the casing 168. The gear 166 is fixed to shaft 170 rotatably borne in the two bearings 172 and 174 so as to take the radial and end loads. This shaft is threaded at its forward end to actuate the nut block which is internally threaded.

The governor assembly is supported by the rods 176 from the aft end case of the prime mover.

The solenoid 137 is hinge supported at its lower end and articulated to the crank 180 rotatably supported at 181. One arm of this crank is a yoke whose legs are articulated to the bearing assembly 182 supported on the sleeve 183. This sleeve is slideable along shaft 150 to which it is keyed for the transmission of rotary effort to the drive plate 144.

The tension in the spring 132 can be regulated by means of the upper sleeve 200 provided on one side with teeth mating with those of the pinion 202. This is rotatably supported and fixed to a lever 204 which can be moved through the link 206, lever 208 and push-pull member 210 passing through the centers of the turbine and compressor shafts. The member 210 has a ring shaped portion 211 to pass about the shaft 216.

The burner 6 is comprised of two V-shaped annular shields whose sides are perforated with many holes so that air will flow therethrough into the space between the legs of the V's. The apex of the V is a tube 190 having small holes which spray fuel toward the base of the V, that is, in the downstream direction of the flow in the combustion chamber. Fuel is fed to the tubes 190 by the fuel tubes 194 spaced about the perimeter and entering the V from the base end so that the tubes are heated by the hot gases issuing from the burners. The flow of fuel is controlled by the pilot operated fuel valve 195.

Ignition is initiated by the spark or glow plugs 196.

The airflow in the combustion chamber is guided past the burners by the divider 197.

The flow of fuel to the auxiliary burner 110 proceeds from the pilot controlled fuel valve 220 (Figure 1) via the tube 222 to the channel 224 which carries the fuel to the annular passage 226 whence it flows by tube 228 to the burner 110. Where the tube 228 passes through the combustion chamber 4 it is equipped with fins 228' to absorb heat enough to raise the fuel temperature to the flash point when it enters the burner 110. However the burner may also be equipped with spark or glow plugs 229 connected to a suitable electricity source.

Figure 2:
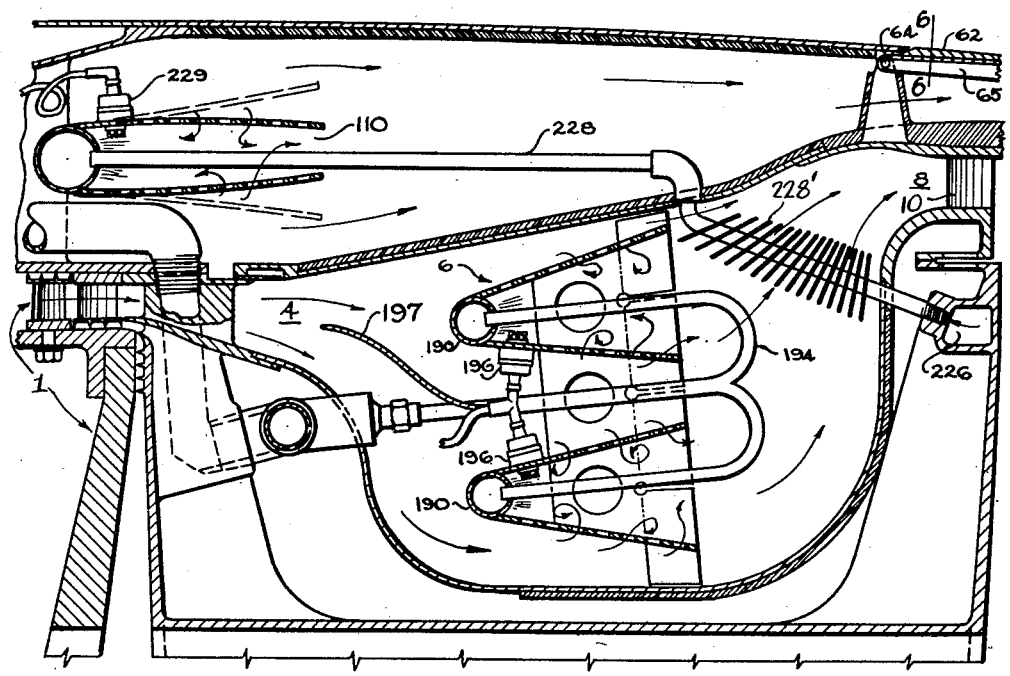
Figure 2 is an enlarged fragmentary longitudinal section of the combustion chamber.

The burners 110 are made of bimetal sheets so that as they become hot they spread wider as indicated by the dotted positions of the legs in Figure 2.

The method of operating the prime mover is to burn fuel in the auxiliary passage 38 during the time of take-off of the aircraft and then when sufficient altitude is reached the fuel is shut off from burner 118. If a burst of speed is later needed the fuel to 118 can be turned on again and the additional thrust is immediately available since the fuel is heated to the flash point by the passage through the combustion chamber 4. This is a feature of the invention.

Suitable power connections are provided at the front of the machine by gears 230 and 231 for auxiliaries and a starter.

It is also a feature of this invention that the mass of air handled in the auxiliary duct 38 is preferably substantially equal to the mass of the flow through the inner compressor. With this proportion the effectiveness of the machine is a maximum whereas if the auxiliary duct handles more than twice the mass flow of the inner compressor, the effectiveness has declined. I have accordingly used twice the mass as the upper limits for my claims.

In another form of the invention illustrated in Figure 8 the turbine blading is designed to extract most of the energy from the turbine gas. This energy is used to drive the propeller 240. Thus as take-off the chief sources of thrust are the propeller 240 and the auxiliary blower operating with the burner 118 heating the air to issue as the jet from exit 60. When sufficient altitude is attained the burner 118 is shut down and the propeller and auxiliary blower supply the thrust which gives economical operation. The prime mover and propeller are shown associated with a wing 242 of an airplane.

I have now described suitable embodiments of my invention which are now preferred. It is to be understood however that the invention is not limited to the particular construction illustrated and described and that I intend to claim it broadly as indicated by the scope of the appended claims.

I claim:

1. In combination to form a power plant having its inlet subject to a variable velocity airstream, an inner axial-flow compressor having a plurality of stages comprised of stator and rotor blades, an outer axial-flow compressor having a duct directed rearward, a plurality of stages within said duct comprised of rotors and stators, the number of rotors in said duct being substantially less than in said inner compressor, common means to rotate said rotors of said inner and outer compressors about a common axis, a gas turbine adapted to receive compressed air from said inner compressor, means to burn fuel in said compressed air to heat it for powering said turbine, nozzle means to direct the exhaust gases from said turbine rearward to form a propulsive jet, means employing said turbine power to rotate said rotors to compress and pump air through said outer compressor and said duct, the air flow from said duct constituting a second propulsive jet of large thrust, and means to adjust the pumping action of said duct rotors for said variation in velocity of said airstream comprising a plurality of adjustable stator blades within said duct ahead of the forward rotor within said duct.

2. In combination to form a power plant having its inlet subject to a variable velocity airstream, an inner axial-flow compressor having a plurality of stages comprised of stator and rotor blades, an outer axial-flow compressor having a duct directed rearward, a plurality of stages within said duct comprised of rotors and stators, the number of rotors in said duct being substantially less than in said inner compressor, common means to rotate said rotors of said inner and outer compressors about a common axis, a gas turbine adapted to receive compressed air from said inner compressor, means to burn fuel in said compressed air to heat it for powering said turbine, nozzle means to direct the exhaust gases from said turbine rearward to form a propulsive jet, means employing said turbine power to rotate said rotors to compress and pump air through said outer compressor and said duct, the air flow from said duct constituting a second propulsive jet of large thrust, and means to adjust the pumping action of said duct rotors for said variation in velocity of said airstream comprising a plurality of adjustable stator blades within said duct spaced axially from a said rotor within said duct.

3. In combination to form a power plant having its inlet subject to a variable velocity airstream, an inner axial-flow compressor having a plurality of stages comprised of stator and rotor blades, an outer axial-flow compressor having a duct directed rearward, a plurality of stages within said duct comprised of rotors and stators, the number of rotors in said duct being substantially less than in said inner compressor, common means to rotate said rotors of said inner and outer compressors about a common axis, a gas turbine adapted to receive compressed air from said inner compressor, means to burn fuel in said compressed air to heat it for powering said turbine, nozzle means to direct the exhaust gases from said turbine rearward to form a propulsive jet, means employing said turbine power to rotate said rotors to compress and pump air through said outer compressor and said duct, the air flow from said duct constituting a second propulsive jet of large thrust, and automatic means to adjust the pumping action of said duct rotors for said variation in velocity of said airstream comprising a plurality of adjustable stator blades within said duct, said automatic means adjusting the attitude of said adjustable stators in response to the velocity of the said airstream.

4. In combination to form a power plant having its inlet subject to a variable velocity airstream, an inner axial-flow compressor having a plurality of stages comprised of stator and rotor blades, an outer axial-flow compressor having a duct directed rearward, a plurality of stages within said duct comprised of rotors and stators, the number of rotors in said duct being substantially less than in said inner compressor, common means to rotate said rotors of said inner and outer compressors about a common axis, a combustion chamber to receive said compressed air and fuel for heating said air to form gases of combustion, a gas turbine receiving said heated air for the production of turbine power, nozzle means to direct the exhaust gases from said turbine rearward to form a propulsive jet for propelling an aircraft, means employing said turbine power to rotate said rotors to compress air in said compressors, the airflow from said duct constituting a second propulsive jet, said duct having a portion of expanded cross sectional area between said duct rotors and the duct exit, a fuel control means, and means to conduct fuel from said control means through said gases of combustion to said duct portion for injection thereinto.

5. In combination, means to compress two independent streams of air to substantially different pressures, means to cause combustion in the stream of greater pressure to form heated products of combustion, means to expand the cross sectional area of the said stream of lower pressure, a fuel control means, heat exchanger means conducting fuel from said control means through said heated products into said stream of expanded cross sectional area, said heat exchanger means heating said fuel to a temperature higher than the flash point whereby to cause combustion in said lower pressure stream and increase its temperature, means deriving energy from the heated air of the stream of higher pressure to operate said means to compress, and nozzle means to emit the hot stream of lower pressure rearward as a propulsive jet.

6. In combination to form a power plant having moving parts, a compressor, a combustion chamber and a gas turbine having a flow of motive gas therethrough, said compressor being adapted to be driven by said turbine to compress air to form said gas flow, said turbine extracting energy from said gas flow, nozzle means to emit said gas flow from said turbine as a propulsive jet, a duct having a portion of enlarged cross section succeeded by an operable variable area nozzle of smaller cross section, means in said duct driven by said turbine to compress air in said duct to form a relatively cold jet, said nozzle serving to emit said cold jet rearward to produce a thrust, means to optionally burn fuel in said air in said duct to increase the jet thrust, said burning of fuel decreasing the gas density and tending to reduce the mass flow in said duct, the rate of movement of a said moving part being a function of said change in said gas density, and means operably connected to said part to actuate said variable area nozzle in response to a change in rate of movement of said part.

7. In combination to form a power plant, a compressor, a combustion chamber and a gas turbine having a flow of motive gas therethrough, said compressor being driven by said turbine to compress air to form said gas flow, said turbine extracting energy from said gas flow, nozzle means emitting said gas flow from said turbine as a propulsive jet, pumping means driven by said turbine to compress air to form a relatively cold jet, means emitting said cold jet to produce thrust, and means automatically operable in response to the relative wind velocity to vary the pumping action of said pumping means.

8. In combination to form a power plant, a compressor, a combustion chamber and a gas turbine having a flow of motive gas therethrough, said compressor being driven by said turbine to compress air to form said gas flow, said turbine extracting energy from said gas flow, means emitting said gas flow from said turbine as a propulsive jet, pumping means driven by said turbine to compress air to form a relatively cold jet emitted to produce thrust, and means responsive to the combined action of the relative wind velocity and the static pressure of the atmosphere to vary the pumping action of said pumping means.

9. In combination to form a power plant having moving parts, a compressor, a combustion chamber and a gas turbine having a flow of motive gas therethrough, said compressor being driven by said turbine to compress air to form said gas flow, said turbine extracting energy from said gas flow, means emitting said gas flow from said turbine as a propulsive jet, a duct, means in said duct driven by said turbine to compress other air to form a relatively cold jet, said duct having an inlet end and an exit end for the passage of said other air therethrough, the rate of movement of said moving part being a function of said varying density of the fluid in said duct, flow control means for an end of said duct automatically operable in response to the rate of movement of the last said moving part of said power plant.

10. In combination to form a power plant having moving parts, a gas turbine, a compressor to deliver compressed air to said turbine, means to heat said compressed air enroute to said turbine to supply motive power therefor, a duct, compressing means in said duct driven by said turbine to compress other air in said duct, said duct having a variable area exit to emit said other air as a propulsive jet, optionally operable means to heat said other air downstream from said compressing means resulting in a change in density of said air in said duct downstream from said compressing means, the rate of movement of a said moving part being alterable in response to said change in said gas density in said duct, and means automatically operable in response to a change in the rate of movement of said part to vary said exit area.

11. In combination to form a power plant having moving parts, a compressor, a combustion chamber and a gas turbine having a flow of motive gas therethrough, said compressor being driven by said turbine to compress air to form said gas flow, said turbine extracting energy from said gas flow, a duct, means in said duct driven by said turbine to compress other air to form a variable density jet, said duct having an inlet end and an exit end for the passage of said other air therethrough, the rate of movement of a said part being a function of said varying density of the fluid in said duct, and automatic control means for an end of said duct automatically operable in response to a change in the rate of movement of a said moving part of said power plant to control the rate of air flow therethrough.

EDWARD A. STALKER.

REFERENCES CITED

The following references are of record in the file of this patent:

UNITED STATES PATENTS

| Number | Name | Date |
|---|---|---|
| 1,154,131 | Sands | Sept. 21, 1915 |
| 1,981,299 | Backler | Nov. 20, 1934 |
| 2,396,911 | Anxionnaz et al. | Mar. 19, 1946 |
| 2,416,389 | Heppner et al. | Feb. 25, 1947 |

OTHER REFERENCES

Ser. No. 367,666, Anxionnaz et al. (A. P. C.) published May 25, 1943.